US009626617B2

(12) United States Patent
Martin et al.

(10) Patent No.: US 9,626,617 B2
(45) Date of Patent: Apr. 18, 2017

(54) RFID TAG ASSEMBLIES AND PROCESS

(71) Applicant: Tagsys SAS, La Ciotat (FR)

(72) Inventors: Philippe Martin, Beaune (FR); Didier Elbaz, Marseilles (FR); Francois Combes, Marseilles (FR)

(73) Assignee: Tagsys SAS (FR)

( * ) Notice: Subject to any disclaimer, the term of this patent is extended or adjusted under 35 U.S.C. 154(b) by 0 days.

(21) Appl. No.: 14/432,821

(22) PCT Filed: Sep. 30, 2013

(86) PCT No.: PCT/AU2013/001106
§ 371 (c)(1),
(2) Date: Apr. 1, 2015

(87) PCT Pub. No.: WO2014/053005
PCT Pub. Date: Apr. 10, 2014

(65) Prior Publication Data
US 2015/0278671 A1   Oct. 1, 2015

(30) Foreign Application Priority Data
Oct. 1, 2012 (AU) ................................ 2012904291

(51) Int. Cl.
*G06K 19/06* (2006.01)
*G06K 19/077* (2006.01)
(Continued)

(52) U.S. Cl.
CPC ...... *G06K 19/0776* (2013.01); *B32B 37/1284* (2013.01); *B32B 37/18* (2013.01);
(Continued)

(58) Field of Classification Search
USPC ............ 235/492, 488, 451; 340/572.5, 572.7
See application file for complete search history.

(56) References Cited

U.S. PATENT DOCUMENTS 5,505,777 A   4/1996 Ciardella et al.
8,508,032 B2 *  8/2013 Owen ........................... 257/692
(Continued)

FOREIGN PATENT DOCUMENTS

WO   2012126063 A1   9/2012

OTHER PUBLICATIONS

International Search Report for Application No. PCT/AU2013/001106 dated Dec. 18, 2013.

*Primary Examiner* — Ahshik Kim
(74) *Attorney, Agent, or Firm* — Lerner, David, Littenberg, Krumholz & Mentlik, LLP

(57) ABSTRACT

A process is disclosed for attaching an RFID tag such as an AK module or QFP package to a flexible surface such as textile or fabric. The process comprises providing a heat fusible label including at least a first layer having a first adhesive layer, a substrate layer including a secondary antenna structure, a heat activated second adhesive layer and a pressure sensitive adhesive (PSA) layer for holding the RFID tag. The process further includes positioning the RFID tag on the PSA layer, pressing the tag against the PSA layer such that the PSA layer holds the tag against the heat fusible label at least temporarily, positioning the heat fusible label with the RFID tag on the flexible surface and applying heat and pressure to the heat fusible label to melt the heat activated layer and to fuse the label to the flexible surface.

20 Claims, 8 Drawing Sheets

(51) Int. Cl.
  *G06K 19/02* (2006.01)
  *B32B 37/12* (2006.01)
  *B32B 37/18* (2006.01)

(52) U.S. Cl.
  CPC .... *G06K 19/027* (2013.01); *B32B 2037/1246* (2013.01); *B32B 2519/02* (2013.01); *Y10T 29/49018* (2015.01); *Y10T 156/10* (2015.01)

(56) References Cited

U.S. PATENT DOCUMENTS

| | | | |
|---|---|---|---|
| 2009/0309703 A1 | 12/2009 | Forster | |
| 2012/0286427 A1* | 11/2012 | Sumitomo | H01L 24/85 257/738 |
| 2014/0103116 A1* | 4/2014 | Martin | H01Q 1/2225 235/488 |

* cited by examiner

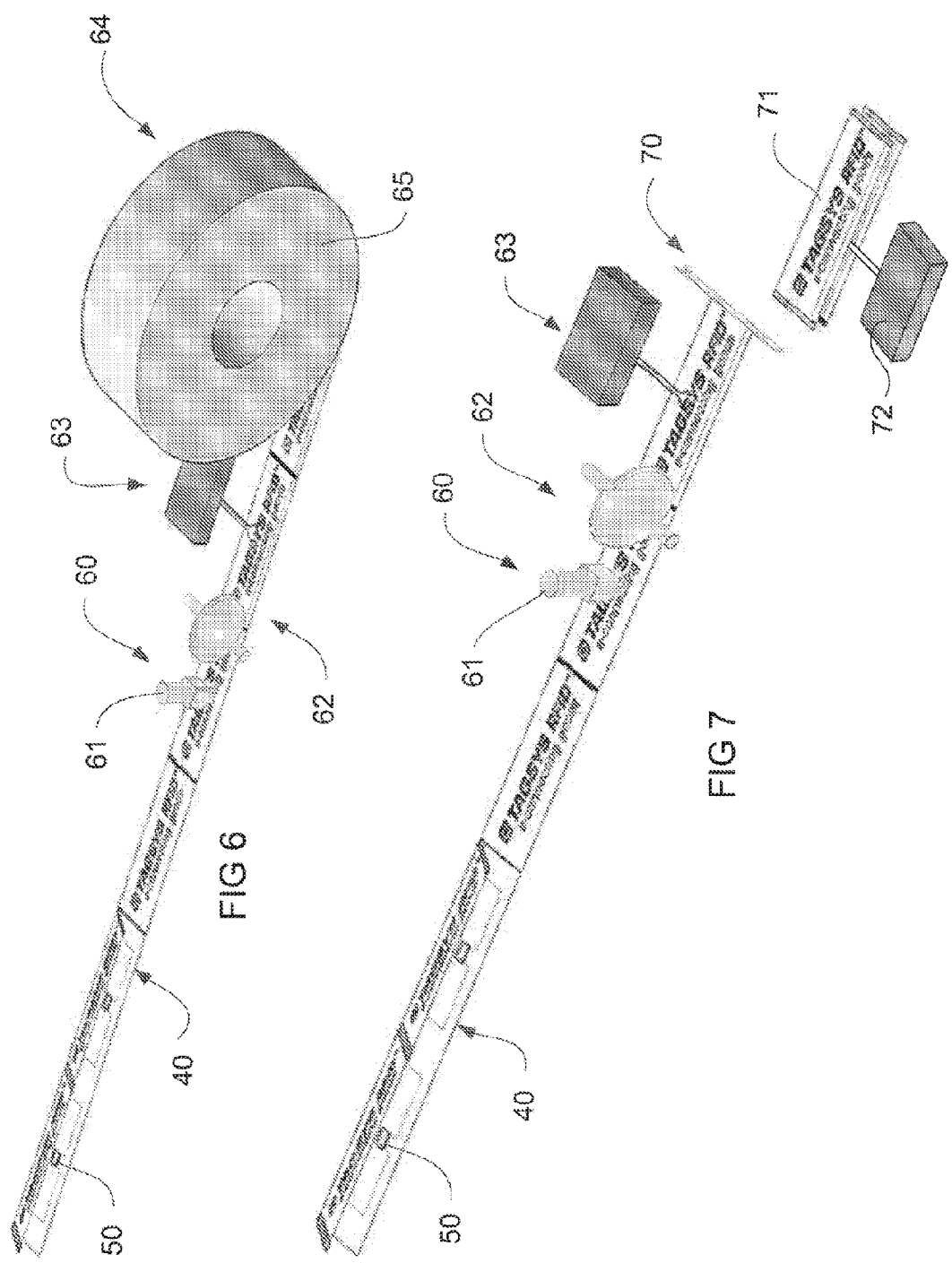

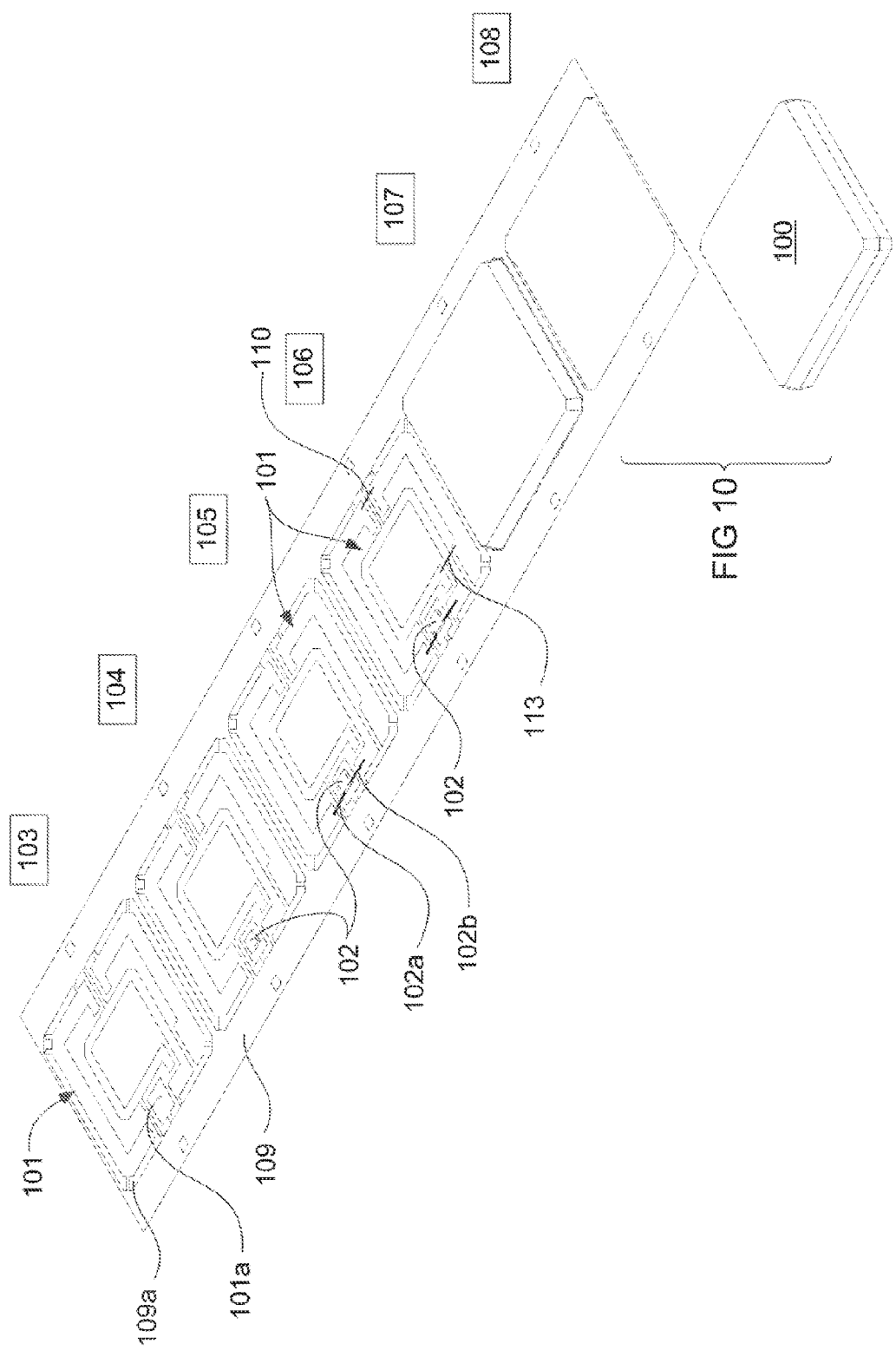

RFID TAG ASSEMBLIES AND PROCESS

CROSS REFERENCE TO RELATED APPLICATIONS

The present application is a national phase entry under 35 U.S.C. §371 of International Application No. PCT/AU2013/001106 filed Sep. 30, 2013, published in English, which claims priority from Australian Patent Application No. 2012904291 filed Oct. 1, 2012. The present invention is related to the following international patent applications assigned to the present applicant the disclosures of which are incorporated herein by cross reference: PCT/AU2010/000373 —RFID TAG ASSEMBLY AND METHOD and PCT/AU2012/000305 —RFID TAG ASSEMBLY AND LABEL PROCESS.

TECHNICAL FIELD

The present invention relates to a tag assembly for attaching an RFID tag to a surface including a flexible surface such as textile or fabric and a process for producing an RFID tag assembly and/or label.

BACKGROUND OF THE INVENTION

Use of a generic RFID tag on a flexible surface such as textile or fabric typically involves stitching or bonding the tag directly to the fabric or enclosing it within a patch to provide an enclosure for the tag. However this often leads to cumbersome and inflexible solutions particularly with a clothing garment that may be uncomfortable to wear.

In one prior art solution, a conductive thread is used to provide a secondary antenna and a plastics encapsulated RFID tag in the form of a traditional clothing button is stitched to the fabric in order to couple to the secondary antenna to form a larger overall tag system. While this solution is flexible and comfortable the thread link holding the button to the fabric loosens over time with repeated washing cycles and the button can rock about or tilt, deteriorating electromagnetic coupling between a primary antenna on the RFID tag and the secondary antenna associated the fabric.

An object of the present invention is to at least alleviate the disadvantages of the prior art.

SUMMARY OF THE INVENTION

According to one aspect of the present invention there is provided a process for attaching an RFID tag including a surface mount integrated package such as an AK module or Quad Flat Package (QFP) to a flexible surface such as textile or fabric, said process comprising: providing a heat fusible label including at least: a) a first layer having a first adhesive layer; b) a substrate layer including a secondary antenna structure; c) a heat activated second adhesive layer; and d) a pressure sensitive adhesive (PSA) layer for holding said RFID tag; positioning said RFID tag on said PSA layer; pressing said tag against said PSA layer such that said PSA layer holds said tag against said heat fusible label at least temporarily; positioning said heat fusible label with said RFID tag on said flexible surface; and applying heat and pressure to said heat fusible label to melt said heat activated layer and to fuse said label to said flexible surface.

The PSA layer may be relatively thin and may provide tack at room temperature. The heat fusible label may include markings to facilitate accurate placement of the RFID tag relative to the secondary antenna structure. The heat fusible label may further include a printable layer applied over the first layer. The printable layer may comprise a coating of white varnish and thermal transfer ink.

The first layer may include a woven polymeric or synthetic material. The secondary antenna structure may be provided by weaving, knitting and/or stitching conductive wire in association with said substrate layer. The substrate layer may include a polymeric layer such as Polyethylene Naphthalate (PEN), Polyimide (PI) or Polyethylene Terephthalate (PET) or a knitted or woven layer. The RFID tag may include an AK module or QFP package.

The secondary antenna may include a dipole antenna. The surface may be flexible such as fabric or textile or it may be relatively rigid such as cardboard. The surface may include an item of clothing.

According to a further aspect of the present invention there is provided a heat fusible RFID label assembly suitable for attachment to a flexible surface such as textile or fabric, said label comprising: a first layer including a first adhesive layer; a substrate layer including a secondary antenna structure; a heat activated second adhesive layer; a pressure sensitive adhesive (PSA) layer for holding said RFID tag at least temporarily; and an RFID tag.

The PSA layer may be relatively thin and may provide tack at room temperature. The heat fusible RFID label assembly may include markings to facilitate placement of the RFID tag relative to the secondary antenna structure. The heat fusible RFID label assembly may further include a printable layer applied over the first layer.

The printable layer may comprise a coating of white varnish and thermal transfer ink. The first layer may include a woven polymeric or synthetic material. The secondary antenna structure may be provided by weaving, knitting and/or stitching conductive wire in association with the substrate layer. The substrate layer may include a polymeric layer (PEN or PI) or a knitted or woven layer. The RFID tag may include an AK module or QFP package.

According to a still further aspect of the present invention there is provided a process for producing an RFID label including an RFID tag, such as an AK module or QFP package, for attaching to a flexible surface such as textile or fabric, said process including forming a label substrate, providing a secondary antenna structure in association with the label substrate, projecting a spot of glue on said label substrate for receiving said RFID tag, locating said RFID tag on said substrate and sealing said cavity and RFID tag with a cover.

The cover may include clear or opaque film or ribbon. The secondary antenna structure may be provided by weaving, knitting and/or stitching conductive wire in association with said label substrate. The process may include monitoring the antenna structure via a fast video camera to determine a position for the spot of glue. The step of locating may be performed via a pick and place machine.

According to a still further aspect of the present invention there is provided a process for producing an RFID tag assembly comprising:
providing a peripheral frame including antenna parts for an associated or primary antenna;
connecting the antenna parts to form said associated antenna having a desired resonant frequency;
connecting an RFID chip to the associated antenna;
encapsulating the RFID chip and associated antenna; and
trimming the peripheral frame;

wherein said step of connecting the antenna parts includes adjusting effective area or inductance of said associated or primary antenna to obtain the desired resonant frequency.

The step of connecting the antenna parts may include placing conductive connections such as wire-bonds between the antenna parts such as lands or zones.

The effective area or inductance of the primary antenna may be adjusted up or down by placing the conductive connections between defined positions on the antenna parts. The defined positions for the conductive connections may be determined by means of a modeling simulator such as ANSYS HFSS.

The associated or primary antenna may include a nested loop antenna. The peripheral frame and antenna parts may be provided by die stamping conductive strip material. The process may include forming the peripheral frame with a plurality of like frames by die stamping from a roll of conductive material. The conductive material may include stainless steel. The RFID tag assembly may include a QFP, LQFP or TQFP package.

In industrial laundries, wear and tear of linen or the like may be reduced by avoiding relatively sharp edges associated with a QFP package. Therefore in some embodiments the epoxy package outer casing may be formed with rounded corners or a substantially round package.

BRIEF DESCRIPTION OF THE DRAWINGS

FIGS. 4-7 show a process for producing an RFID label;
FIGS. 10-11 show details of a process for producing an RFID tag assembly/QFP kernel.

DETAILED DESCRIPTION OF THE INVENTION

Figure 1:
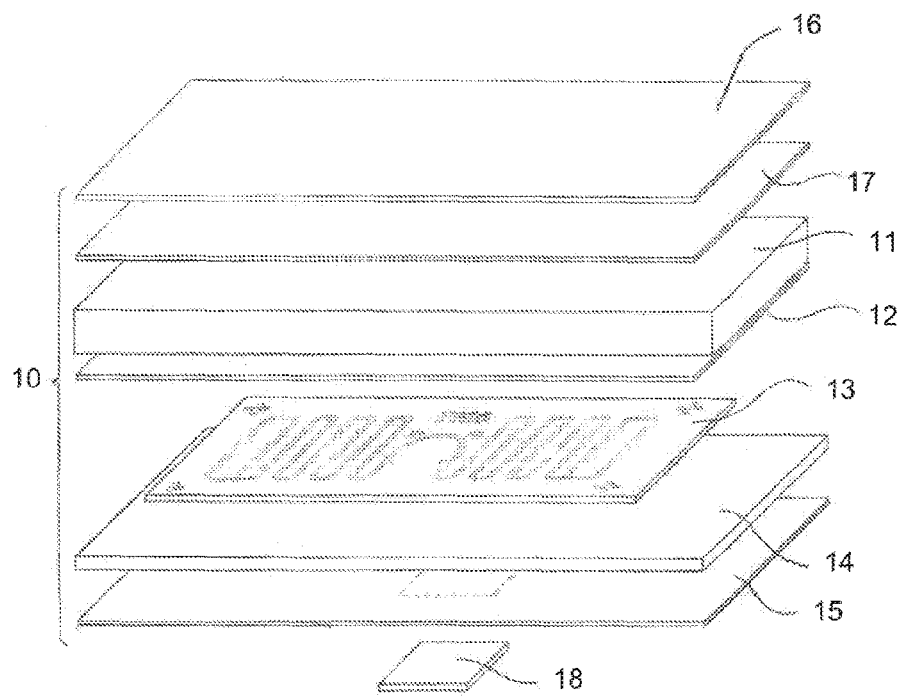
FIGS. 1-3 show a heat fusible label assembly and process for producing an RFID label.

A tag assembly method is described below with reference to FIG. 1. FIG. 1 shows a thermo patch assembly 10 comprising at least the following layers:
1. a top woven polymeric sheet or synthetic layer 11;
2. an adhesive layer 12 for a secondary antenna layer;
3. a secondary antenna layer 13;
4. a heat activated adhesive layer 14; and
5. a relatively thin pressure sensitive adhesive (PSA) layer 15.

Top woven polymeric sheet or synthetic layer 11 may include a PI, PEN or PET substrate that is relatively resistant to high temperatures including temperatures that may be at least 200° C. or more. In one form the top layer 11 may include a PI layer that is 30 µm to 100 µm in thickness. Secondary antenna layer 13 may be provided on a woven (textile or fabric) or plastics (PEN) substrate. Secondary antenna layer 13 may include a 17 µm-35 µm thick etched copper layer to provide the radiating loop of the secondary antenna.

An optional over-layer 16 such as polycarbonate sheet or polyester fiber and a polyurethane primer layer 17 may be applied over top layer 11 to make the thermo patch assembly 10 printable and/or waterproof. Primer layer 17 may include a 30 to 40 µm thick white printable polymeric varnish, or a white PET/PEN laminated overlay.

Heat activated adhesive layer 14 may include a 50 µm thick polyurethane adhesive layer such as a layer of hot melt glue. PSA layer 15 may include a 20 µm acrylic layer with room temperature tack to hold in place RFID tag 18.

A plurality of thermo patch assemblies 10 may be optionally applied to a carrier reel or tape including a "siliconized" or release layer or liner. The release layer or liner (not shown) may allow for easy peeling of thermo patch assembly 10 with a small force and should provide a clean release that does not retain any traces of PSA layer 15 on its surface. The main function of the optional carrier reel or tape is to carry a plurality of cut-out patch assemblies 10 on a "reel" or "roll" for transport and delivery where the patch assemblies may be peeled off manually or automatically using dedicated equipment.

The thermo patch assembly 10 may be used to apply an RFID tag 18 to a garment or fabric as described below with reference to FIG. 3. The PSA layer 15 may facilitate alignment of RFID tag 18 relative to secondary antenna layer 13 as described below.

Figure 2:
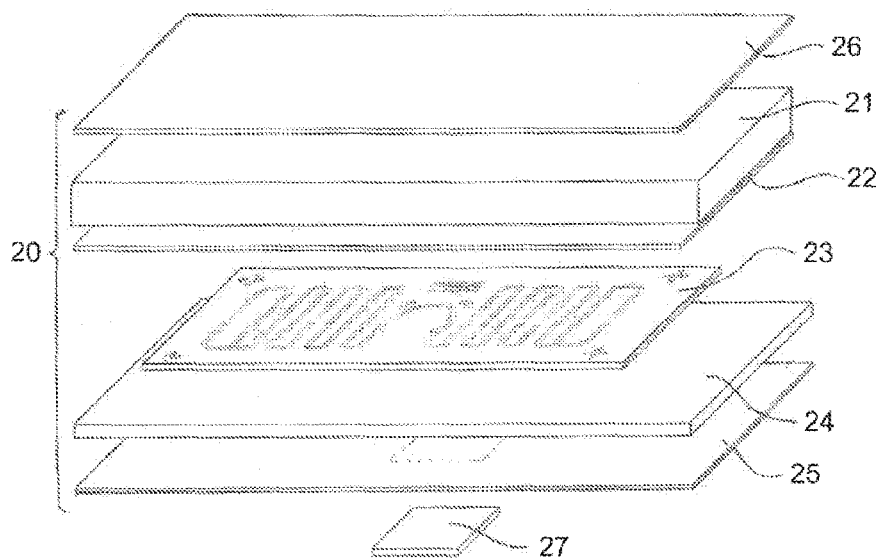

A further tag assembly method is described below with reference to FIG. 2. FIG. 2 shows a thermo patch assembly 20 comprising at least the following layers:
1. a top woven polymeric sheet (PI/PEN/PET) or synthetic layer 21;
2. an adhesive layer 22 for a secondary antenna layer;
3. a secondary antenna layer 23;
4. a heat activated adhesive layer 24 such as a polyurethane adhesive layer; and
5. a relatively thin PSA layer 25 with room temperature tack.

Polymeric sheet 21 may include a Polyimide, PEN, PET substrate that is relatively resistant to high temperatures (200° C. minimum) and 20-50 µm thick. Secondary antenna layer 23 may be provided on a woven (textile or fabric) or plastics (PEN) substrate. An optional over-layer 26 comprising printable white varnish with thermo transfer ink on top may be applied over top layer 21 to make the patch assembly 20 printable and/or waterproof. The thermo patch assembly 20 may be used to apply an RFID tag 27 to a garment or fabric as described below with reference to FIG. 3. Optional overlayer 26 may be omitted in low cost versions of the thermo patch assembly 20.

Figure 3:
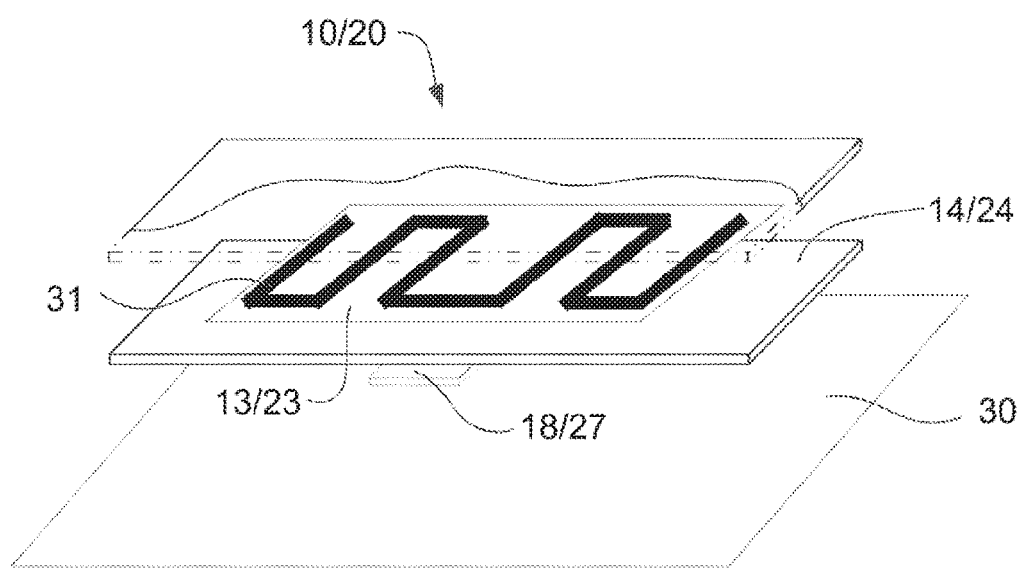

Referring to FIG. 3 an RFID tag 18 or 27 (QFP/TQFP) may be sandwiched between a flexible surface 30 such as fabric, textile or a garment and an opaque and printable thermo patch 10 or 20 as described above. As described, thermo patch 10 or 20 includes a layer of heat activated adhesive layer 14 or 24 on its underside that is adapted to hold antenna layer 13 or 23. Antenna layer 13 or 23 comprises a polymeric substrate such as polyethylene napthalate (PEN) with an antenna pattern 31 applied thereto. Antenna pattern 31 comprises a laminate of a conductor such as copper or aluminium that may be about 10-17 um in thickness. Heat activated adhesive layer 14 or 24 is interposed between antenna layer 13 or 23 and a garment or fabric surface 30 for heat sealing patch 10 or 20 to hold antenna layer 13 or 23 and RFID tag 18 or 27 in position against garment or fabric surface 30. It is desirable that each RFID tag 18 or 27 be placed accurately relative to antenna pattern 31 to facilitate close electromagnetic coupling to a primary antenna (not shown) that is associated with RFID tag 18 or 27.

The method of attaching thermo patch 10 or 20 to a surface 30 may be performed manually using heat sealing equipment set at around 170-200° to press and activate the adhesive. The patch assembly 10 or 20 may then be resistant to washers and driers. The process may use a conventional etched aluminium or copper conductive antenna on a PEN substrate (the latter may withstand higher temperatures than PET) which is adhered to a thermo sealing patch. Printable patches 10 with secondary antenna already attached and covered with heat activated adhesive such as hot melt glue may be supplied to an operator ready for attachment to garment/fabric surface 30 or the like.

The operator may initially peel off from a reel a precut label assembly and turn it upside down to view a marked antenna pattern including a central tag receiving part. The operator may then place RFID tag 18 or 27 (QFP/TQFP) against the tag receiving part of the label which may hold the tag 18 or 27 via the thin PSA layer 15 with room temperature tack. The operator may then turn the thermo patch assembly 10 or 20 upside down and place the RFID tag 18 or 27 (QFP/TQFP) and thermo patch assembly 10 or 20 on top of garment or fabric surface 30. Thermal sealing equipment may then be used to press and heat the thermo patch 10 or 20 on top of garment or fabric surface 30 causing the thermo patch 10 or 20 and RFID tag 18 or 27 to be attached to the garment or fabric surface 30.

Figure 4:
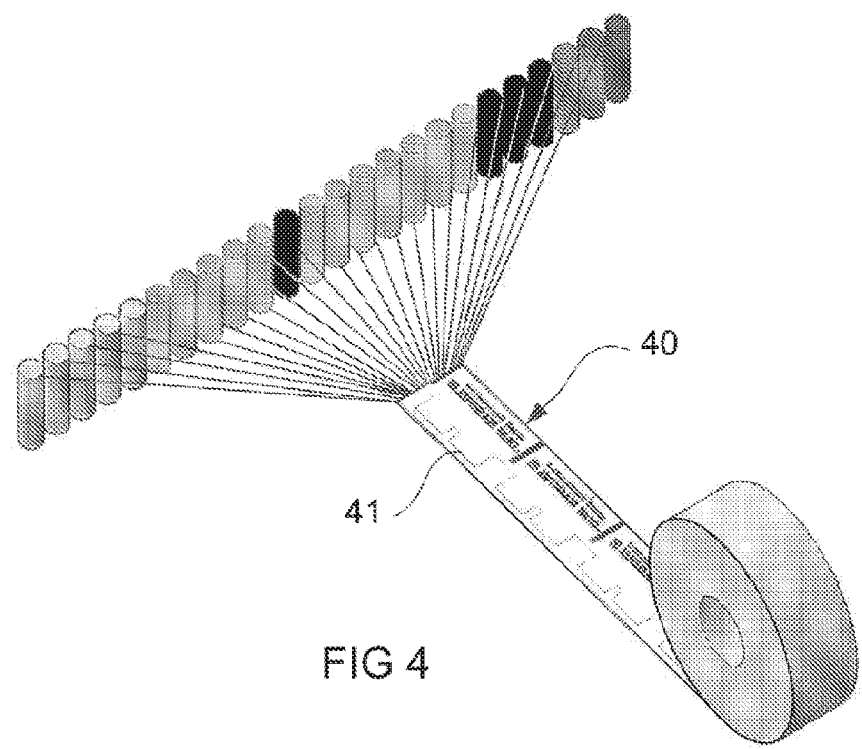

FIG. 4 shows tape substrate 40 being woven or knitted on a loom (not shown). Tape substrate 40 comprises a plurality of yarns including synthetic yarns such as polyester nylon, polyamide and carbon and conductive yarns such as stainless steel suitable for industrial washing liquids. The conductive yarns may be woven, knitted and/or stitched in association with tape substrate 40 to form an antenna pattern 41. The antenna pattern 41 may form plural separate antennas after tape substrate 40 is singulated into individual labels. Each label may be attached to an article such as an item of clothing. The tape substrate may include a printed logo. The logo may be laser printed or applied using industrial means such as inkjet, thermal transfer or sublimation onto the singulated label during assembly or it may be printed onto a reel of tape substrate before assembly.

Figure 5:
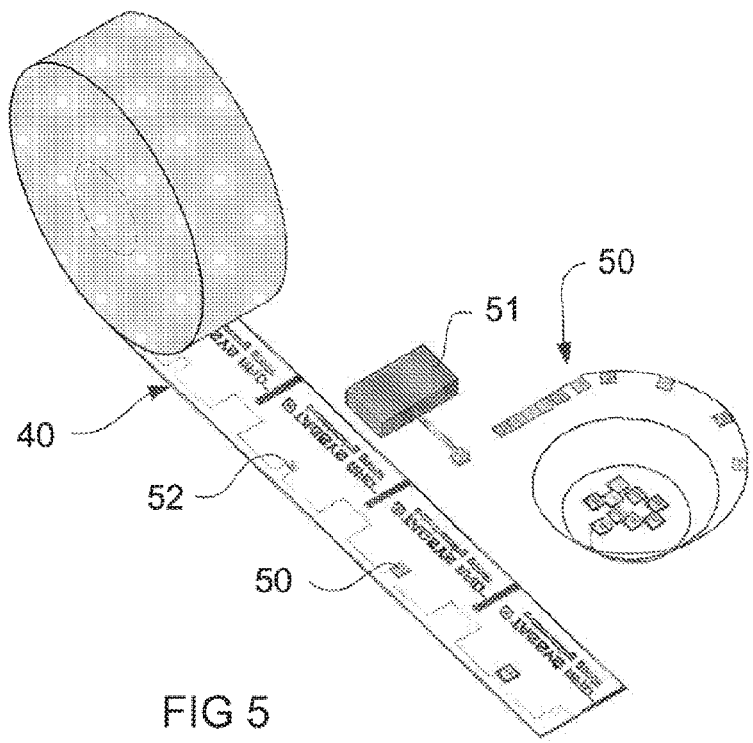

FIG. 5 shows a production line process for attaching RFID tags 50 to tape substrate 40 such as by means of a multi-step online machine. The process includes supplying individual tags 50 via a bowl feeder or the like and testing and programming each tag 50 at a testing station 51 prior to attaching the tags 50 to tape substrate 40. Each tag 50 is attached to tape substrate 40 via a layer or spot of adhesive 52 which may be precisely projected or applied to tape substrate 40. This may be followed by accurate positioning of each tag 50 relative to antenna pattern 41 (refer FIG. 4) using a pick and place machine. Accurate placement may ensure good electromagnetic coupling to a primary antenna associated with tag 50. Adhesive 52 may be applied or projected with assistance of a monitoring station (not shown). The monitoring station may accurately monitor the secondary antenna pattern 41 using a fast video camera or the like.

FIG. 6 shows a fusing station 60 which follows a tape folding station (not shown) for folding tape substrate 40 in half over tags 50. Fusing station 60 includes fusing tool 61 including four sonotrodes (raised portions). The sonotrodes cooperate with an anvil (not shown) to make four spot welds around each RFID tag 50. The four spot welds create a pocket between the folded layers of tape substrate 40 for locating RFID tag 50 in the pocket. FIG. 6 includes an ultrasonic welding station 62 for continuously sealing the open seam comprising folded layers of tape substrate 40. This is followed by testing of each label with tag 50 at testing station 63. Labels that do not pass the test may be marked with a black dot or punched with a hole for identification. FIG. 6 includes a winding station 64 for winding the tested labels onto roll 65 suitable for subsequent automatic deposition of labels.

The singulation station may include a punching tool or laser. FIG. 7 shows a modification of the process shown in FIG. 6 including singulation station 70 for cutting tape substrate 40 into individual labels 71 via a punch or laser and a testing station 72 for testing isolated ribbon antenna following singulation. The process in FIG. 7 is suitable for manual deposition of individual labels 71.

Figure 8:
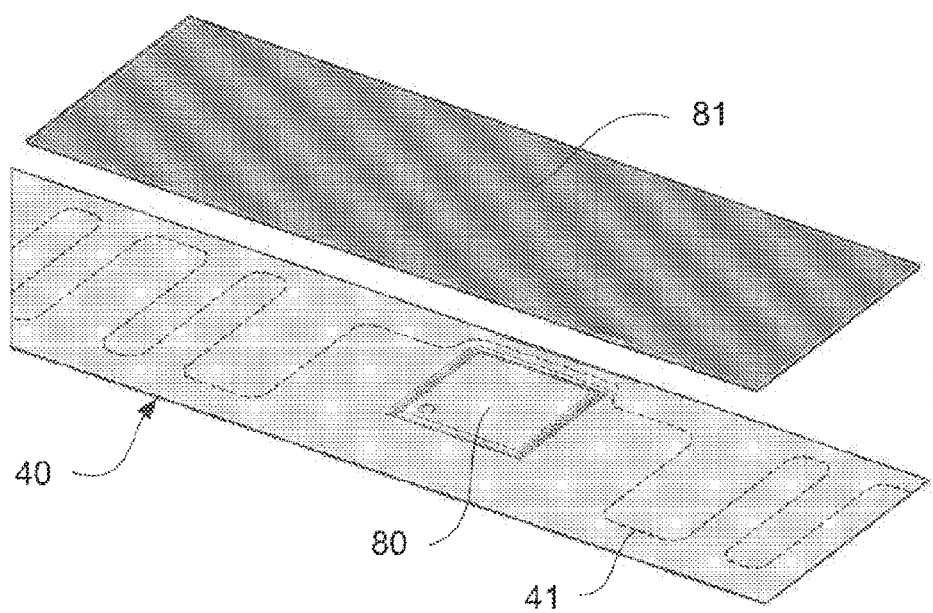
FIGS. 8-9 show a further process for producing an RFID label.
Figure 9:
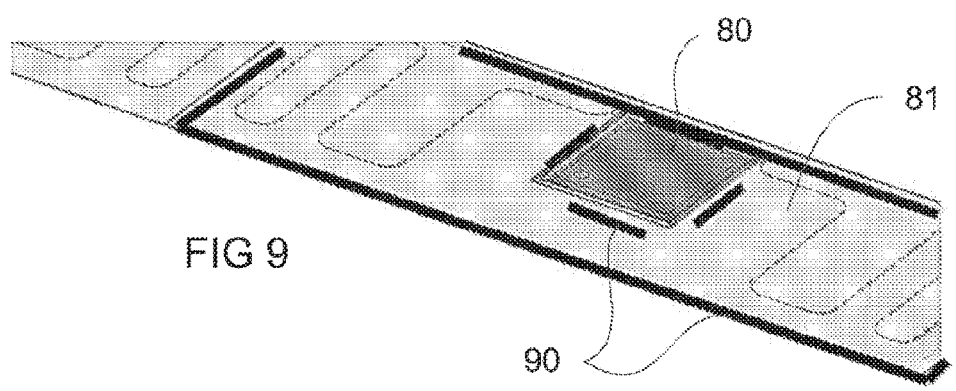

FIGS. 8 and 9 show a modification to the production line process in FIGS. 5 to 7.

FIG. 8 shows tape substrate 40 formed with an antenna pattern 41 passing around RFID tag 80 after testing and positioned over tape substrate 40. FIG. 8 also shows a polyester film cover 81 comprising clear or opaque ribbon positioned over tape substrate 40 and RFID tag 80. Film cover 81 comprises polyester film. Film cover 81 may be formed from extensible material to facilitate stretching over RFID tag 90 as it is ultrasonically welded to tape substrate 40 via seams 90 as shown in FIG. 9.

FIG. 10 shows inline steps for producing an RFID tag assembly 100 including a primary antenna 101 and IC (integrated circuit) chip 102. Primary antenna 101 comprises planar nested loops to reduce the overall dimensions of the RFID assembly while still being able to resonate at a desired frequency such as 860 MHz to 900 MHz. The production steps include steps 103-108 which may be carried out at respective production stations (not shown).

A ribbon of stainless steel material may be die stamped at step 103 to provide a strip of peripheral frames 109, each containing antenna parts joined to frame 109 via narrow strips of material 109*a*.

IC chip or die 102 is bonded at step 104 to a chip receiving land 101*a* via a non-conductive adhesive. IC chip or die 102 is electrically connected to primary antenna 101 at wire bonding step 105. IC chip 102 is electrically connected to pads or lands of antenna 101 via wires 102*a*, 102*b* as is known in the art.

Because the input impedance of each chip 102 may vary even when it comes from the same batch of a specific manufacturer, it is desirable to accurately match the inductance of each primary antenna 101 to the input impedance of associated IC chip 102.

The input impedance of IC chip 102 may be represented via a capacitor/resistor equivalent circuit. The primary antenna loop creates an inductance (L) which compensates for on chip capacitance (C) at the resonant frequency ($Fr=1/(2\times\pi\times\sqrt{L\times C})$), which may be near 860 MHz to 900 MHz. The parameter that may be adjusted easily is the inductance L, while on chip capacitance C may be in the range of 0.8 pF to 1.2 pF.

The parts of antenna 101 are joined together at wire bonding step 106 to produce a primary antenna 101 as described below. The resonant frequency of primary antenna 101 depends on the effective area or inductance of the antenna loop. The effective area or inductance of the antenna loop may be adjusted up or down by joining the antenna parts via carefully positioned wire bonds 110, 113. Wire bonds 110, 113 may be placed in defined positions on the antenna parts such as pads or lands 111, 112, 114, 115 (refer FIG. 11).

The position of each wire bond 110, 113 may determine the effective area and inductance of primary antenna 101. Minute changes to positions of bonds 110, 113 may be used to finely tune the resonant frequency of primary antenna 101 to RFID chip 102 regardless of the manufacturer used to supply RFID chip 102. Fine tuning of the resonant frequency of the primary antenna is desirable to guarantee performance of an RFID tag assembly in the face of variations in input impedance of each RFID chip. Examples of wire bonding step 106 are described below with reference to FIGS. 11A to 11D.

The resonant frequency of antenna 101 may additionally be adjusted to compensate for a detuning effect or frequency shift that occurs when an RFID tag including a primary antenna is electromagnetically coupled to a secondary antenna when the primary and secondary antennas are brought together. Both antennas frequencies are shifted towards each other such that the lower frequency of the primary antenna shifts upwards nearer to a 900 MHz optimum (happy medium between EU and US Bands) and the higher frequency of the secondary antenna shifts downwards. Critical or optimum coupling may see both frequencies very close to each other at 900 MHz to match the frequency of an interrogating carrier wave.

Hence the relevant performance criterion is the one for a complete RFID assembly including the RFID tag assembly or primary kernel coupled to a secondary antenna. The coupling shift for the primary resonant frequency may be determined by experience/modelling and/or via a trial and error method.

Frequency compensation may go even further and may also be used to adjust resonant frequency of the primary antenna to specific applications in which detuning or frequency shifting may be experienced in some environments such as water, rubber, etc. due to a high level of dielectric constant of an environment. In such an environment a deliberate frequency shift may be required to compensate for a detuning effect due to a higher dielectric constant.

Step 107 includes encapsulating the antenna 101 and chip 102 by surrounding the RFID tag assembly via a dedicated mold and injecting epoxy resin material into the mold. An advantage of using a standard QFP casing is that it may enable reuse of existing standard size molds.

However, as noted above wear and tear of linen or the like may be reduced in industrial laundries by avoiding relatively sharp edges associated with a QFP package. Therefore it is desirable in some embodiments to produce the epoxy package outer casing rounded in shape rather than square. A round shape is not standard although a dedicated mold can be made to accommodate a package of any shape, size and form from 5 mm to 50 mm dimensions and is readily available from the micro-packaging industry.

Step 108 includes trimming the peripheral frame 109 to obtain a singulated RFID tag assembly 100.

Figure 11A:
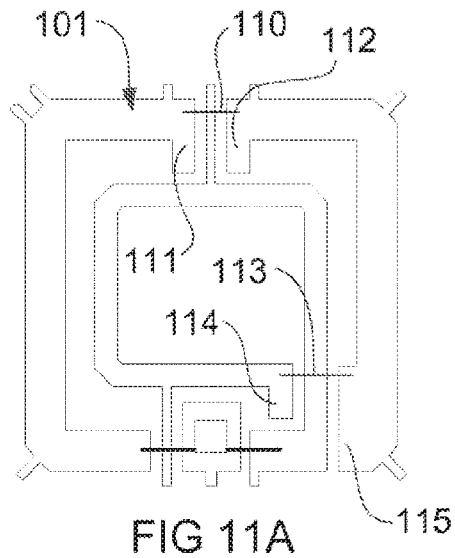

FIG. 11A shows an example of a standard wiring (V1) for a MONZA 5 chip wherein the top wire bond 110 is near the tops of upper lands 111,112 and the bottom wire bond 113 is near the tops of lower lands 114, 115.

Figure 11B:
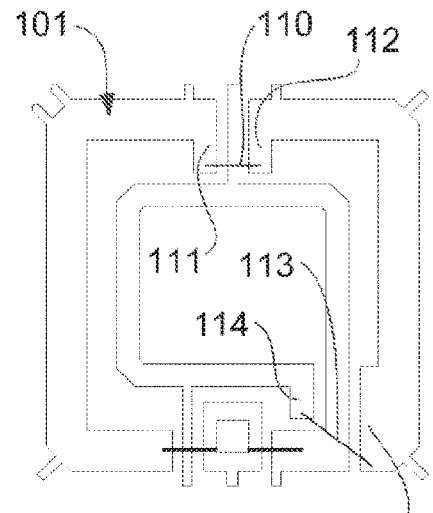

FIG. 11B shows an example of a long wiring (V2) for a MONZA 5 chip wherein the top wire bond 110 is near the bottom of upper lands 111,112 and the bottom wire bond 113 is near the bottoms of lower lands 114, 115.

Figure 11C:
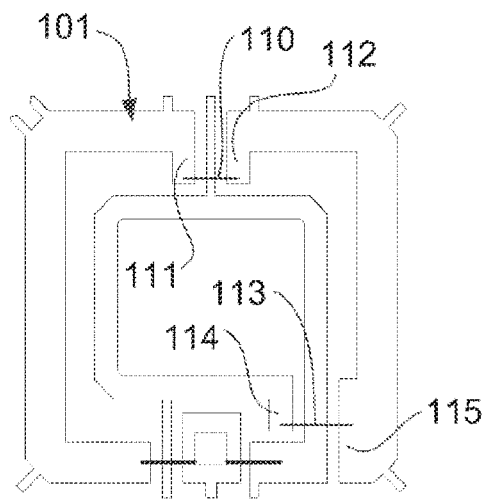

FIG. 11C shows a standard wiring for a G2iL chip wherein the top wire bond 110 is near the bottoms of upper lands 111,112 and the bottom wire bond 113 is near the bottom of lower land 114 and near the middle of lower land 115.

Figure 11D:
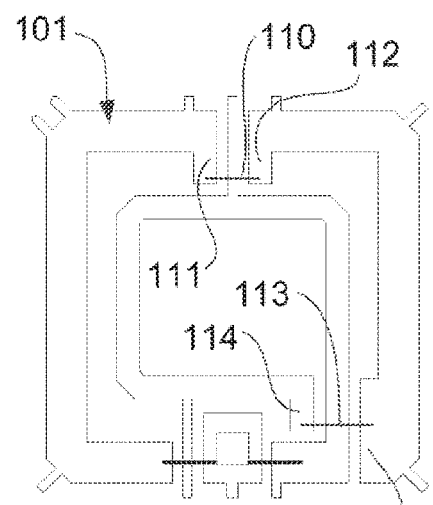

FIG. 11D shows a standard wiring for an EM4124 chip wherein the top wire bond 110 is near the bottom of upper lands 111,112 and the bottom wire bond 113 is near the bottom of lower land 114 and near the middle of lower land 115.

The positions of wire bonds 110, 113 may be accurately determined by means of a 3D electromagnetic field simulation tool such as ANSYS HFSS. The simulation tool may allow the position of each wire bond 110, 113 to be accurately defined since as noted above the performance of an RFID tag assembly depends in part on the impedance of primary antenna 101 matching RFID chip 102.

Figure 12:
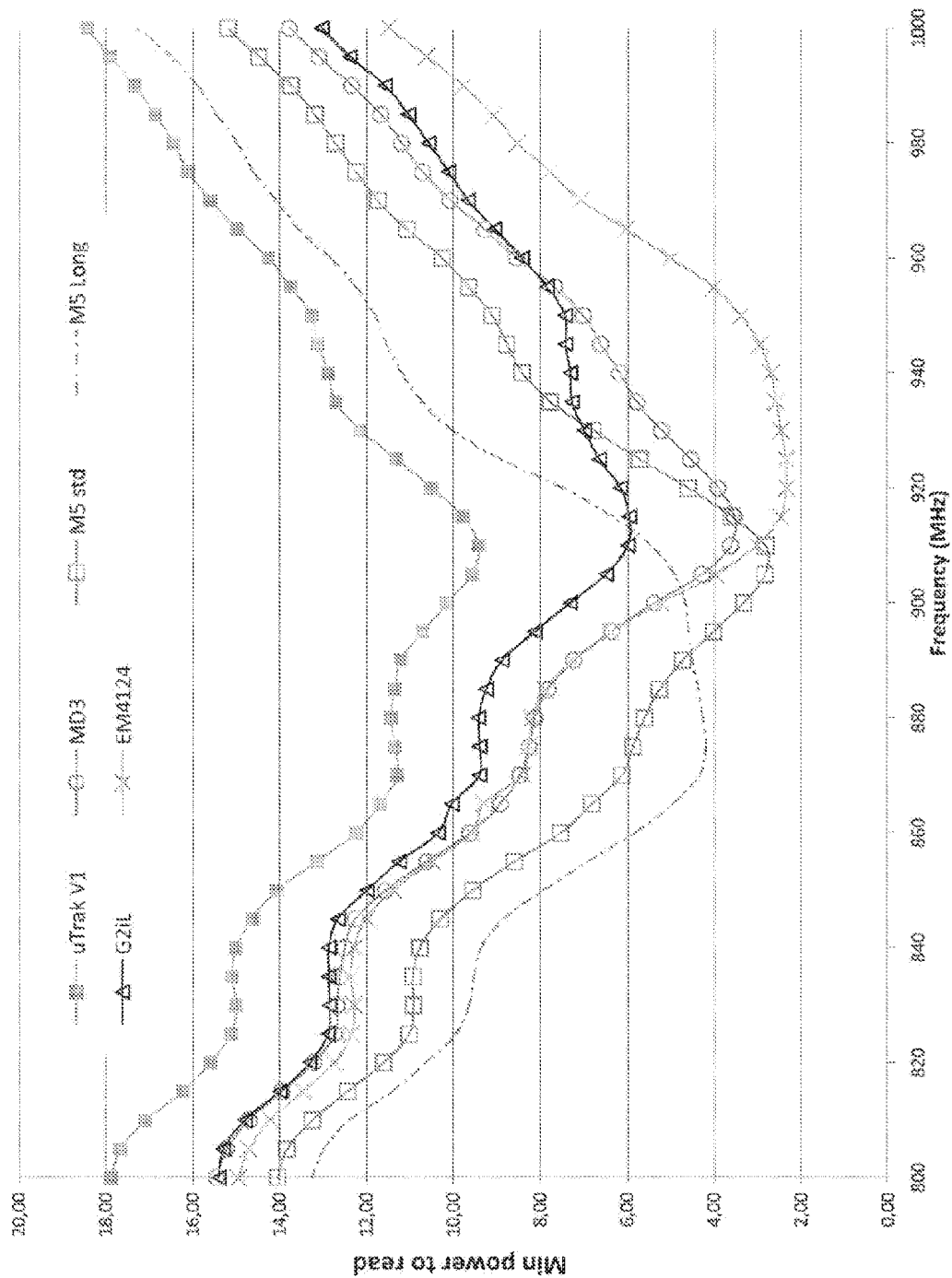
FIG. 12 shows a graph of minimum power levels to initiate communication for various RFID tag assemblies.

FIG. 12 shows dips in power levels to initiate communication for various RFID tag assemblies including the four tag assemblies shown in FIG. 11A-11D, wherein the curves for the four tag assemblies are labeled M5 std, M5 Long, G2IL and EM 4124 respectively.

The curve represented by uTrak V1 is an older design with a single turn design and with no frequency adjustment possible using Monza 4D older generation RFID chips. It may be seen that the curve for uTrak V1 is positioned high in the graph denoting a lower sensitivity since the Y-axis denotes power levels necessary to communicate with the chip in dBm. The higher power levels necessary to initiate communication with a chip imply a lower sensitivity and thus read range performance criteria. According to FIG. 12 the M5 long wiring chip (Monza 5 series) provides the best performance as far as frequency and sensitivity are concerned.

Finally, it is to be understood that various alterations, modifications and/or additions may be introduced into the constructions and arrangements of parts previously described without departing from the spirit or ambit of the invention.

The invention claimed is:

1. A process for attaching an RFID tag such as a QFP package to a flexible surface, said process comprising:
   providing a heat fusible label including at least:
   a) a first layer having a first adhesive layer;
   b) a substrate layer including a secondary antenna structure;
   c) a heat activated second adhesive layer; and
   d) a pressure sensitive adhesive (PSA) layer for holding said RFID tag, wherein said PSA layer is relatively thin and provides tack at room temperature;
   positioning said RFID tag on said PSA layer;
   pressing said tag against said PSA layer such that said PSA layer holds said tag against said heat fusible label at least temporarily;
   positioning said heat fusible label with said RFID tag on said flexible surface; and
   applying heat and pressure to said heat fusible label to melt said heat activated layer and to fuse said label to said flexible surface.

2. A process for attaching an RFID tag according to claim 1, wherein said heat fusible label further includes a printable layer applied over said first layer, and wherein said printable layer comprises a coating of white varnish and thermal transfer ink.

3. A process for attaching an RFID tag according claim 1, wherein said first layer includes a woven polymeric or synthetic material, and wherein said secondary antenna structure is provided by weaving, knitting and/or stitching conductive wire in association with said substrate layer.

4. A process for attaching an RFID tag according to claim 1, wherein said RFID tag includes an AK module or QFP package.

5. A heat fusible RFID label assembly suitable for attachment to a flexible surface, said label comprising:
   a first layer including a first adhesive layer;
   a substrate layer including a secondary antenna structure;
   a heat activated second adhesive layer;

a pressure sensitive adhesive (PSA) layer for holding said RFID tag at least temporarily, wherein said PSA layer is relatively thin and provides tack at room temperature; and an RFID tag.

6. A heat fusible RFID label assembly according to claim 5, further including a printable layer applied over said first layer, wherein said printable layer comprises a coating of white varnish and thermal transfer ink.

7. A heat fusible RFID label assembly according to claim 5, wherein said first layer includes a woven polymeric or synthetic material, and wherein said secondary antenna structure is provided by weaving, knitting and/or stitching conductive wire in association with said substrate layer.

8. A heat fusible RFID label assembly according to claim 5, wherein said RFID tag includes an AK module or QFP package.

9. A process for producing an RFID label including an RFID tag, such as a QFP package, for attaching to a flexible surface, said process including forming a label substrate, providing a secondary antenna structure in association with the label substrate, projecting a spot of glue on said label substrate for receiving said RFID tag, locating said RFID tag on said substrate and sealing said RFID tag with a cover, and wherein said cover includes clear or opaque film or ribbon.

10. A process for producing a RFID label according to claim 9, wherein said secondary antenna structure is provided by weaving, knitting and/or stitching conductive wire in association with said label substrate.

11. A process according to claim 9, including monitoring said antenna structure via a fast video camera to determine a position for said spot of glue.

12. A process according to claim 9, wherein said step of locating is performed via a pick and place machine.

13. A process for producing an RFID tag assembly comprising:
providing a peripheral frame including antenna parts for an associated or primary antenna;
connecting the antenna parts to form said associated antenna having a desired resonant frequency;
connecting an RFID chip to the associated antenna;
encapsulating the RFID chip and associated antenna; and
trimming the peripheral frame;
wherein said step of connecting the antenna parts includes adjusting effective area or inductance of said associated or primary antenna to obtain the desired resonant frequency.

14. A process according to claim 13 wherein the step of connecting the antenna parts includes placing conductive connections between the antenna parts.

15. A process according to claim 13, wherein each conductive connection includes a wire bond, and wherein each antenna part includes at least one land or bonding zone.

16. A process according to claim 13, wherein said effective area or inductance is adjusted up or down by placing conductive connections between defined positions on said antenna parts.

17. A process according to claim 13, wherein said associated or primary antenna includes a nested loop antenna.

18. A process according to claim 13, wherein said peripheral frame and antenna parts are provided by die stamping conductive strip material.

19. A process according to claim 13, including forming said peripheral frame with a plurality of like frames by die stamping from a roll of conductive material, wherein said conductive material includes stainless steel.

20. A process according claim 13, wherein said RFID tag assembly includes a QFP, LQFP or TQFP package.

* * * * *